United States Patent
Chen et al.

(10) Patent No.: US 7,916,401 B2
(45) Date of Patent: Mar. 29, 2011

(54) OPTICAL LENS SYSTEM FOR TAKING IMAGE

(75) Inventors: Chun-Shan Chen, Taichung (TW); Tsung-Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 68 days.

(21) Appl. No.: 12/563,118

(22) Filed: Sep. 19, 2009

(65) Prior Publication Data

US 2010/0321798 A1    Dec. 23, 2010

(30) Foreign Application Priority Data

Jun. 19, 2009    (TW) .................................. 98120684 A

(51) Int. Cl.
  *G02B 3/02*    (2006.01)
  *G02B 13/18*    (2006.01)
  *G02B 9/12*    (2006.01)
(52) U.S. Cl. ........................................ 359/716; 359/784
(58) Field of Classification Search .................. 359/716, 359/784
See application file for complete search history.

(56) References Cited

U.S. PATENT DOCUMENTS

| | | | | |
|---|---|---|---|---|
| 6,970,306 B2* | 11/2005 | Matsuo | ......................... | 359/716 |
| 6,977,779 B2* | 12/2005 | Shinohara | ...................... | 359/716 |
| 7,130,133 B2* | 10/2006 | Sun | .............................. | 359/716 |
| 7,196,855 B2* | 3/2007 | Yamaguchi | ................... | 359/785 |
| 7,212,354 B2* | 5/2007 | Sun | .............................. | 359/784 |
| 7,408,725 B2* | 8/2008 | Sato | ............................. | 359/785 |
| 2010/0202065 A1* | 8/2010 | Tang et al. | ..................... | 359/784 |

* cited by examiner

*Primary Examiner* — David N Spector

(57) ABSTRACT

An optical lens system for taking image comprises, in order from the object side to the image side: an aperture stop; a first lens element with positive refractive power having a convex object-side surface and a convex image-side surface; a plastic second lens element with negative refractive power having a concave object-side surface, a convex image-side surface and at least one aspheric surface; a plastic third lens element with negative refractive power having a convex object-side surface, a concave image-side surface and at least one aspheric surface. The number of the lens elements with refractive power being limited to three. Focal lengths of the optical lens system, the first lens element, the second lens element and the third lens element are f, f1, f2, f3 respectively; Abbe numbers of the first and second lens elements are V1, V2 respectively, an on-axis distance between second and third lens elements is T23, and they satisfy the relations: $0.8<f/f1<1.8$; $0<|f/f2|<0.8$; $0<|f/f3|<0.7$; $20<V1-V2<38$; $0.13<T23/f<0.21$.

19 Claims, 6 Drawing Sheets

OPTICAL LENS SYSTEM FOR TAKING IMAGE

BACKGROUND OF THE INVENTION

1. Field of the Invention

The present invention relates to an optical lens system for taking image, and more particularly to a miniaturized optical lens system for taking image used in a mobile phone camera.

2. Description of the Prior Art

In recent years, with the popularity of the mobile phone camera, the optical lens system for taking image has become thinner and thinner, and the electronic imaging sensor of a general digital camera is typically a CCD (Charge Coupled Device) or CMOS (Complementary Metal Oxide Semiconductor) sensor. Due to advances in semiconductor manufacturing, the pixel size of sensors has been reduced continuously, and miniaturized optical lens systems for taking image have increasingly higher resolution. Therefore, there's increasing demand for image quality.

A conventional lens system for taking image used in mobile phone often consists of three lens elements: from the object side to the image side: a first lens element with positive refractive power, a second lens element with negative refractive power and a third lens element with positive refractive power, thus forming the so-called type of Triplet, such as the optical lens system for taking image described in U.S. Pat. No. 7,436,603. Although such an arrangement can correct most of the aberrations caused by the optical lens system while providing a wide angle of view, it requires a relatively long track length of the optical lens system, so the lens structure must be lengthened and it will be difficult to maintain the objective of miniaturization of the optical lens system for taking image.

The present invention mitigates and/or obviates the aforementioned disadvantages.

SUMMARY OF THE INVENTION

The primary objective of the present invention is to provide an optical lens system for taking image comprising three lens elements to improve image quality, effectively control the total track length of the optical lens system and maintain the objective of miniaturization of the optical lens system.

An optical lens system for taking image in accordance with the present invention comprises: in order from the object side to the image side: an aperture stop; a first lens element with positive refractive power having a convex object-side surface and a convex image-side surface; a second lens element with negative refractive power having a concave object-side surface and a convex image-side surface; and a third lens element with negative refractive power having a convex object-side surface and a concave image-side surface. In the optical lens system for taking image, the number of the lens elements with refractive power is limited to three. Such lens arrangements can effectively improve image quality of the system and maintain the objective of miniaturization of the optical lens system.

In the present optical lens system for taking image, the refractive power of the system is mainly provided by the first lens element with positive refractive power. The first lens element is a biconvex lens element, so that the refractive power of the first lens element can be effectively increased, and the total track length of the optical lens system will become much shorter. The second lens element with negative refractive power mainly serves to correct the chromatic aberration. The third lens element serves as a correction lens elements to balance and correct various aberrations caused by the optical lens system. In addition, the third lens element is negative, so that the principal point of the system will be far away from the image plane, and it will be favorable to reduce the total track length of the optical lens system, so as to maintain the objective of miniaturization of the optical lens system for taking image.

The first lens element provides main positive refractive power, and the aperture stop is located close to the object side, so that the total track length of the optical lens system can be effectively reduced, and the exit pupil of the optical lens system will be far away from the image plane. Therefore, the light will be projected onto the sensor with a relatively small incident angle, this is the telecentric feature of the image side, and this feature is very important to the photosensitive power of current solid-state sensors, since they are more sensitive when the light is incident at a small angle. This also reduces the probability of the occurrence of shading. According to one aspect of the present invention, in the present optical system for taking image, at least one inflection point is formed on the third lens element and contribute to a better correction of the incident angle of the off axis light with respect to the sensor.

With the trend of miniaturization of the optical lens system and the requirement of increasing the field of view, the focal length of the optical lens system is becoming very short. Therefore, the radius of curvature and the size of the lens elements must be very small, and it is difficult to make such glass lens elements by the use of conventional grinding. According to another aspect of the present invention, in the present optical lens system for taking image, plastic material is introduced to make lens elements by injection molding, using relatively low cost to produce high precision lens elements. The lens elements are provided with aspheric surfaces, allowing more design parameter freedom (than spherical surfaces), so as to better reduce the aberration and the number of the lens elements, thus effectively reducing the total track length of the optical lens system.

According to another aspect of the present invention, in the present optical lens system for taking image, the focal length of the optical lens system for taking image is f, the focal length of the first lens element is f1, and they satisfy the relation:

$$0.8 < f/f1 < 1.8.$$

If f/f1 satisfies the above relation, the refractive power of the first lens element is more balanced, thus allowing effective control of the total track length of the optical lens system, so as to maintain the objective of miniaturization of the optical lens system for taking image. Meanwhile, it will be favorable to correct the high order aberration of the system, improving the image quality of the optical lens system. Further, it will be better if f/f1 satisfies the relation:

$$1.2 < f/f1 < 1.6.$$

According to another aspect of the present invention, in the present optical lens system for taking image, the focal length of the optical lens system for taking image is f, the focal length of the second lens element is f2, and they satisfy the relation:

$$0 < |f/f2| < 0.8.$$

If f/f2 satisfies the above relation, it will be favorable to correct the chromatic aberration caused by the optical lens system. Further, it will be better if f/f2 satisfies the relation:

$$0.2 < |f/f2| < 0.6.$$

According to another aspect of the present invention, in the present optical lens system for taking image, the focal length of the optical lens system for taking image is f, the focal length of the third lens element is f3, and they satisfy the relation:

$$0<|f/f3|<0.7.$$

If f/f3 satisfies the above relation, the third lens element with negative refractive power will make the principal point of the system far away from the image plane, which will be favorable for reducing the total track length of the optical lens system, so as to maintain the objective of miniaturization of the optical lens system for taking image. Further, it will be better if f/f3 satisfies the relation:

$$0.14<|f/f3|<0.7.$$

According to another aspect of the present invention, in the present optical lens system for taking image, the Abbe number of the first lens element is V1, the Abbe number of the second lens element is V2, and they satisfy the relation:

$$20<V1-V2<38.$$

If V1 and V2 satisfy the above relation, it will be favorable to correct the chromatic aberration caused by the optical lens system, improving the image quality of the optical lens system. Further, it will be better if V1 and V2 satisfy the relations:

$$28<V1-V2<35;$$

$$V2<25.$$

According to another aspect of the present invention, in the present optical lens system for taking image, the on-axis distance between the first lens element and the second lens element is T12, the on-axis distance between the second lens element and the third lens element is T23, the focal length of the optical lens system for taking image is f, and they satisfy the relations:

$$0.08<T12/f<0.13;$$

$$0<T23/f<0.21.$$

The above relations can allow better correction of the higher order aberrations of the system. Further, it will be better if T23/f satisfies the relation:

$$0.13<T23/f<0.21.$$

Further, it will be even better if T23/f satisfies the relation:

$$0.15<T23/f<0.18.$$

According to another aspect of the present invention, in the present optical lens system for taking image, the radius of curvature of the object-side surface of the first lens element is R1, the radius of curvature of the image-side surface of the first lens element is R2, and they satisfy the relation:

$$-0.8<R1/R2<0.$$

If R1/R2 satisfies the above relation, it will be favorable to correct the spherical aberration caused by the system.

According to another aspect of the present invention, in the present optical lens system for taking image, the focal length of the optical lens system for taking image is f, the focal length of the third lens element is f3, and they satisfy the relation:

$$0<|f/f3|<0.4.$$

If f/f3 satisfies the above relation, the third lens element serves as a correction lens element to balance and correct various aberrations caused by the optical lens system, it will be favorable to correct the astigmatism and the distortion caused by the optical lens system, improving the resolution of the optical lens system. Further, it will be better if f/f3 satisfies the relation:

$$0<|f/f3|<0.2.$$

According to another aspect of the present invention, in the present optical lens system for taking image, an object to be photographed is imaged on an electronic imaging sensor, the total track length of the optical lens system for taking image is TTL, which is defined as a distance from the object-side surface of the first lens element to the image plane along the optical axis, the maximum image height of the optical lens system for taking image is ImgH, which is defined as half of the length of the diagonal of the electronic imaging sensor's effective pixel region, and they satisfy the relation:

$$TTL/ImgH<2.3.$$

The above relation can maintain the objective of miniaturization of the optical lens system for taking image.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1:
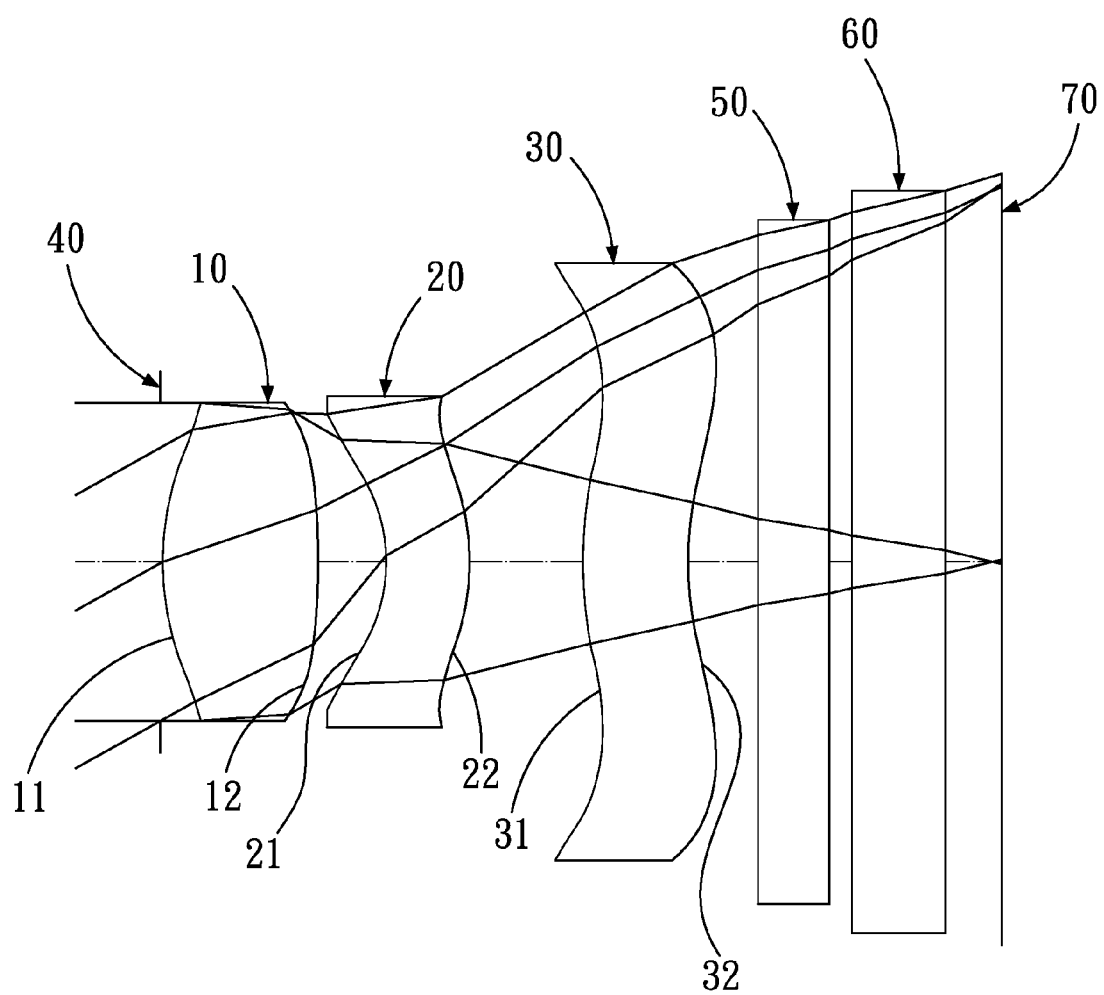
FIG. 1 shows an optical lens system for taking image in accordance with a first embodiment of the present invention.
Figure 2:
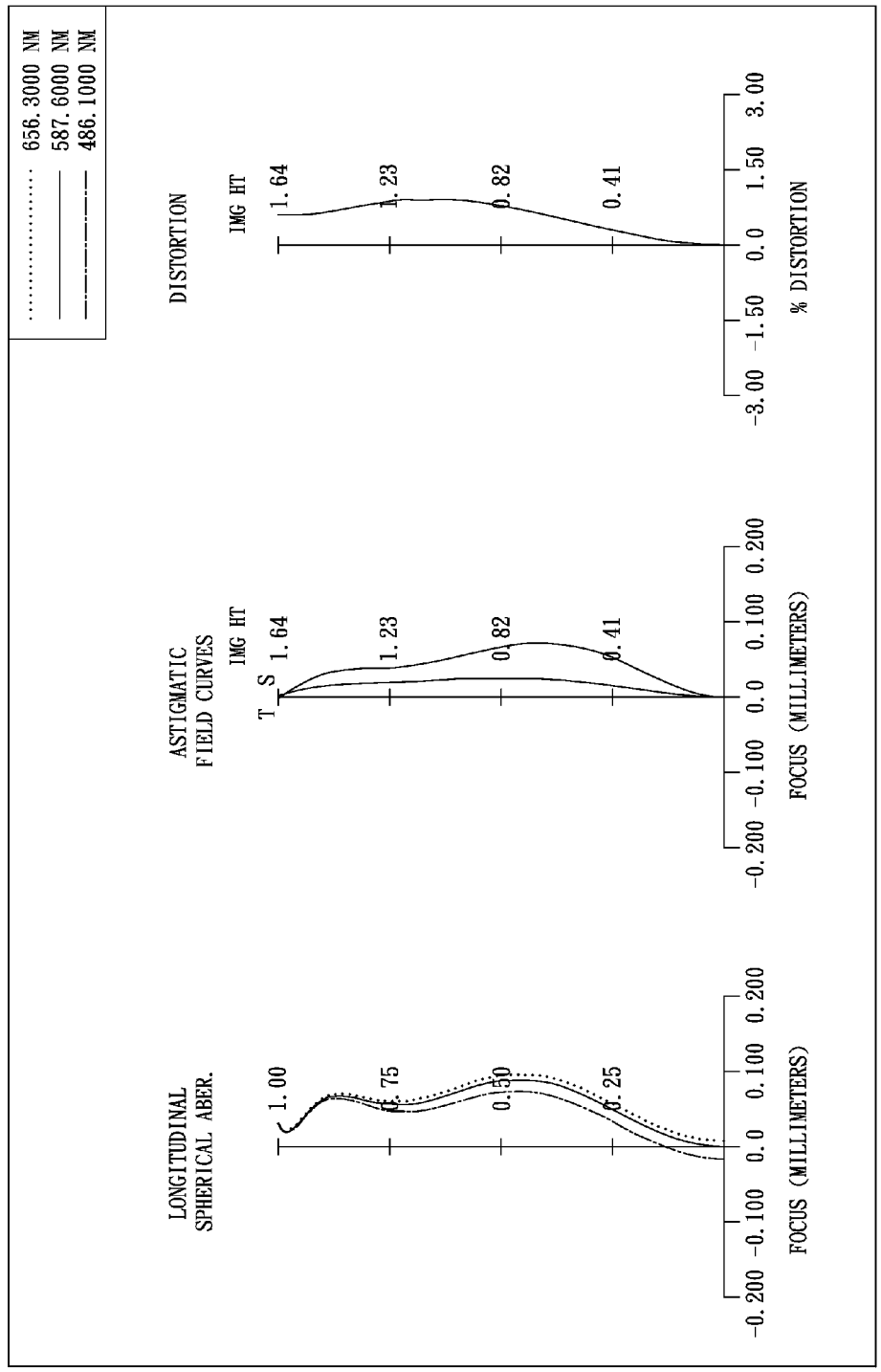
FIG. 2 shows the aberration curves of the first embodiment of the present invention.

Referring to FIG. 1, which shows an optical lens system for taking image in accordance with a first embodiment of the present invention, and FIG. 2 shows the aberration curves of the first embodiment of the present invention. An optical lens system for taking image in accordance with the first embodiment of the present invention comprises: in order from the object side to the image side:

A plastic first lens element 10 with positive refractive power has a convex object-side surface 11 and a concave image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

An aperture stop 40 located between an object to be imaged and the first lens element 10.

An IR cut filter 50 is located behind the third lens element 30 and has no influence on the focal length of the optical lens system.

A sensor cover glass 60 is located behind the IR cut filter 50.

An image plane 70 is located behind the sensor cover glass 60.

The equation for the aspheric surface profiles of the first embodiment is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric lens surface at a distance Y from the optical axis relative to the tangential plane at the aspheric surface vertex;

Y: the distance from the point on the curve of the aspheric surface to the optical axis;

k: the conic coefficient;

Ai: the aspheric surface coefficient of order i.

In the first embodiment of the present optical lens system for taking image, the focal length of the optical lens system for taking image is f, the focal length of the first lens element is f1, the focal length of the second lens element is f2, the focal length of the third lens element is f3, and they satisfy the relations:

f=2.85 mm;

f/f1=1.45;

|f/f2|=0.54;

|f/f3|=0.01.

In the first embodiment of the present optical lens system for taking image, the Abbe number of the first lens element is V1, the Abbe number of the second lens element is V2, and they satisfy the relations:

V2=23.4;

V1−V2=33.1.

In the first embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

T12/f=0.10;

T23/f=0.17.

In the first embodiment of the present optical lens system for taking image, the radius of curvature of the object-side surface of the first lens element is R1, the radius of curvature of the image-side surface of the first lens element is R2, and they satisfy the relation:

R1/R2=−0.24.

In the first embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

TTL/ImgH=2.19.

The detailed optical data of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 2.85 mm, Fno = 2.0, HFOV (half of field of view) = 30.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | 0.012 | | | | |
| 2 | Lens 1 | 1.27148(ASP) | 0.662 | Plastic | 1.543 | 56.5 | 1.96 |
| 3 | | −5.37780(ASP) | −0.042 | | | | |
| 4 | | Plano | 0.334 | | | | |
| 5 | Lens 2 | −0.73520(ASP) | 0.357 | Plastic | 1.632 | 23.4 | −5.32 |
| 6 | | −1.11786(ASP) | 0.483 | | | | |
| 7 | Lens 3 | 1.40491(ASP) | 0.450 | Plastic | 1.530 | 55.8 | −453.07 |
| 8 | | 1.24177(ASP) | 0.300 | | | | |
| 9 | IR-filter | Plano | 0.300 | Glass | 1.517 | 64.2 | |
| 10 | | Plano | 0.100 | | | | |
| 11 | Sensor cover glass | Plano | 0.400 | Glass | 1.517 | 64.2 | |
| 12 | | Plano | 0.238 | | | | |
| 13 | Image | Plano | | | | | |

Note:
an effective aperture of surface #4 is 1.30 mm.

TABLE 2

Aspheric Coefficients

| | Surface # | | | | | |
|---|---|---|---|---|---|---|
| | 2 | 3 | 5 | 6 | 7 | 8 |
| k = | −7.70514E−01 | −1.00000E+00 | −1.02785E+00 | −2.46038E+00 | −1.12753E+01 | −8.53478E+00 |
| A4 = | −5.32528E−02 | −2.53389E−01 | −4.47270E−01 | −2.22350E−01 | −1.94697E−01 | −1.35584E−01 |
| A6 = | 2.47138E−01 | −5.89138E−01 | 3.18283E+00 | 1.15868E+00 | 1.05611E−01 | 2.79360E−02 |
| A8 = | −8.73845E−01 | 6.19228E−01 | −9.35976E+00 | −2.16806E−01 | −8.13415E−02 | −2.36777E−02 |
| A10 = | | | 2.01829E+01 | | 5.72435E−03 | 7.25554E−03 |
| A12 = | | | −1.74745E+01 | | 9.65261E−03 | −2.18989E−03 |

Figure 3:
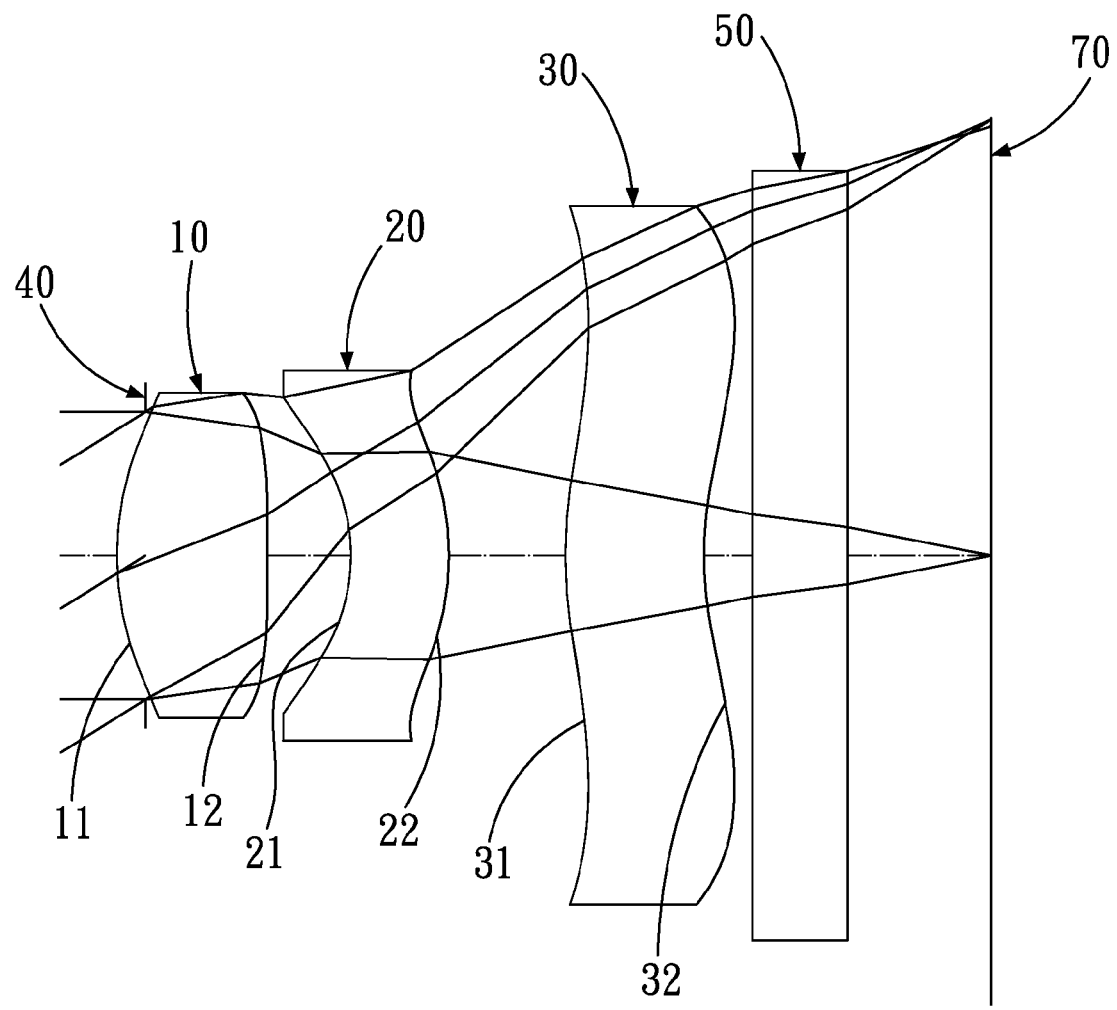
FIG. 3 shows an optical lens system for taking image in accordance with a second embodiment of the present invention.
Figure 4:
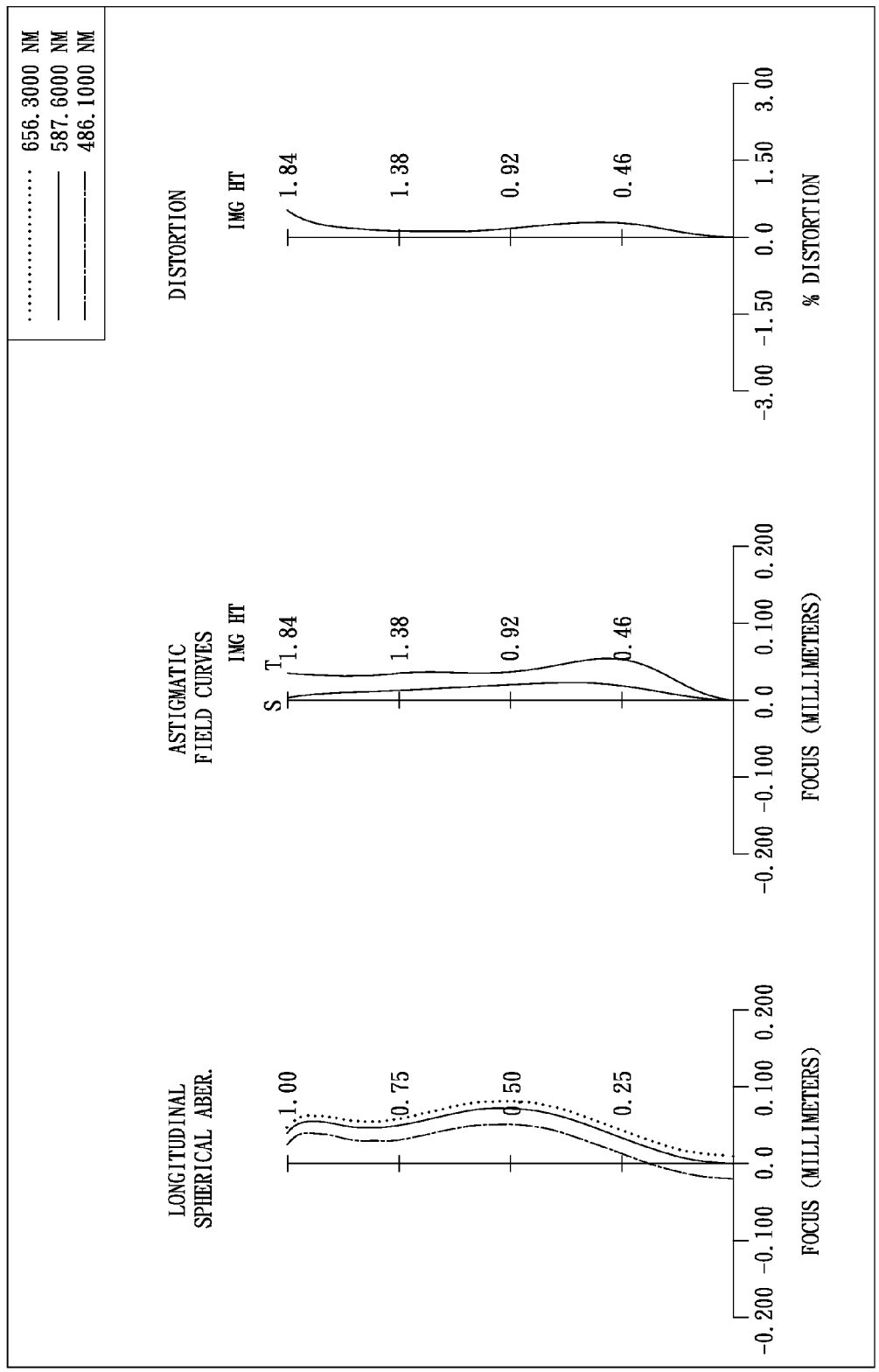
FIG. 4 shows the aberration curves of the second embodiment of the present invention.

Referring to FIG. 3, which shows an optical lens system for taking image in accordance with a second embodiment of the present invention, and FIG. 4 shows the aberration curves of the second embodiment of the present invention. The second embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

An aperture stop 40 located between an object to be imaged and the first lens element 10.

An IR cut filter 50 is located behind the third lens element 30 and has no influence on the focal length of the optical lens system.

An image plane 70 is located behind the IR cut filter 50.

The equation for the aspheric surface profiles of the second embodiment has the same form as that of the first embodiment.

In the second embodiment of the present optical lens system for taking image, the focal length of the optical lens system for taking image is f, the focal length of the first lens element is f1, the focal length of the second lens element is f2, the focal length of the third lens element is f3, and they satisfy the relations:

$f=2.98$ mm;

$f/f1=1.38$;

$|f/f2|=0.44$;

$|f/f3|=0.01$.

In the second embodiment of the present optical lens system for taking image, the Abbe number of the first lens element is V1, the Abbe number of the second lens element is V2, and they satisfy the relations:

$V2=23.4$;

$V1-V2=33.1$.

In the second embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

$T12/f=0.12$;

$T23/f=0.16$.

In the second embodiment of the present optical lens system for taking image, the radius of curvature of the object-side surface of the first lens element is R1, the radius of curvature of the image-side surface of the first lens element is R2, and they satisfy the relation:

$R1/R2=-0.07$.

In the second embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

$TTL/ImgH=1.99$.

The detailed optical data of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 2.98 mm, Fno =2.4, HFOV (half of field of view) = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.122 | | | | |

TABLE 3-continued (Embodiment 2)
f(focal length) = 2.98 mm, Fno =2.4, HFOV (half of field of view) = 31.9 deg.

| Surface # | | Curvature Radius | Thickness | Material | Index | Abbe # | Focal length |
|---|---|---|---|---|---|---|---|
| 2 | Lens 1 | 1.24732(ASP) | 0.634 | Plastic | 1.543 | 56.5 | 2.16 |
| 3 | | −16.76160(ASP) | 0.351 | | | | |
| 4 | Lens 2 | −0.77667(ASP) | 0.410 | Plastic | 1.632 | 23.4 | −6.72 |
| 5 | | −1.14482(ASP) | 0.487 | | | | |
| 6 | Lens 3 | 1.57997(ASP) | 0.584 | Plastic | 1.530 | 55.8 | −523.61 |
| 7 | | 1.36988(ASP) | 0.200 | | | | |
| 8 | IR-filter | Plano | 0.400 | Glass | 1.517 | 64.2 | |
| 9 | | Plano | 0.606 | | | | |
| 10 | Image | Plano | | | | | |

TABLE 4

Aspheric Coefficients

| | Surface # | | | | | |
|---|---|---|---|---|---|---|
| | 2 | 3 | 4 | 5 | 6 | 7 |
| k = | −6.63236E−01 | −1.00000E+00 | −8.85506E−01 | −1.54208E+00 | −1.72542E+01 | −1.02942E+01 |
| A4 = | −3.70760E−02 | −2.10860E−01 | −4.07125E−01 | −2.08105E−01 | −1.27711E−01 | −1.22336E−01 |
| A6 = | 2.41923E−01 | −3.25519E−01 | 2.26157E+00 | 8.91844E−01 | 8.98958E−02 | 5.56231E−02 |
| A8 = | −7.20219E−01 | −1.24321E−01 | −6.52207E+00 | −2.04299E−01 | −3.89445E−02 | −2.62793E−02 |
| A10 = | | | 1.18605E+01 | | 4.16286E−03 | 6.03044E−03 |
| A12 = | | | −8.54184E+00 | | 8.09157E−04 | −7.99887E−04 |

Figure 5:
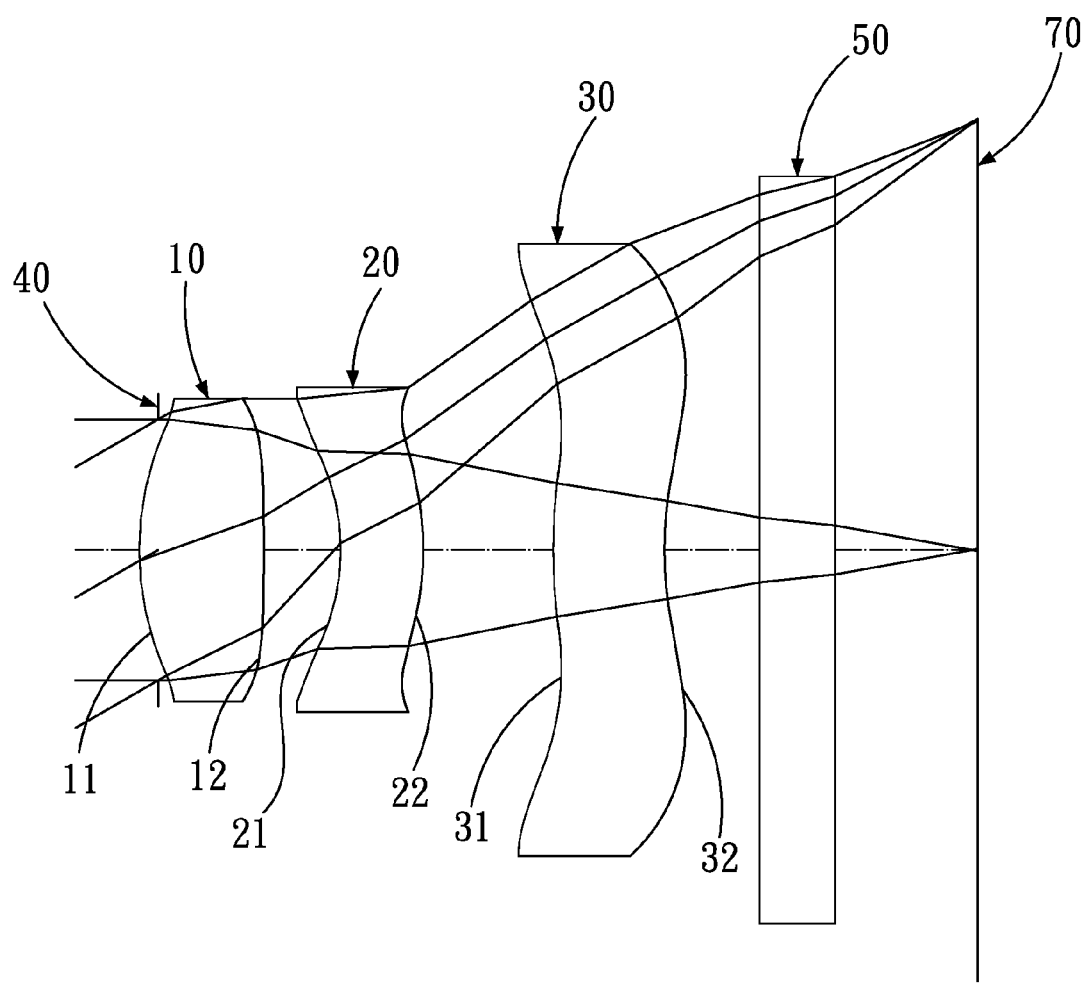
FIG. 5 shows an optical lens system for taking image in accordance with a third embodiment of the present invention.
Figure 6:
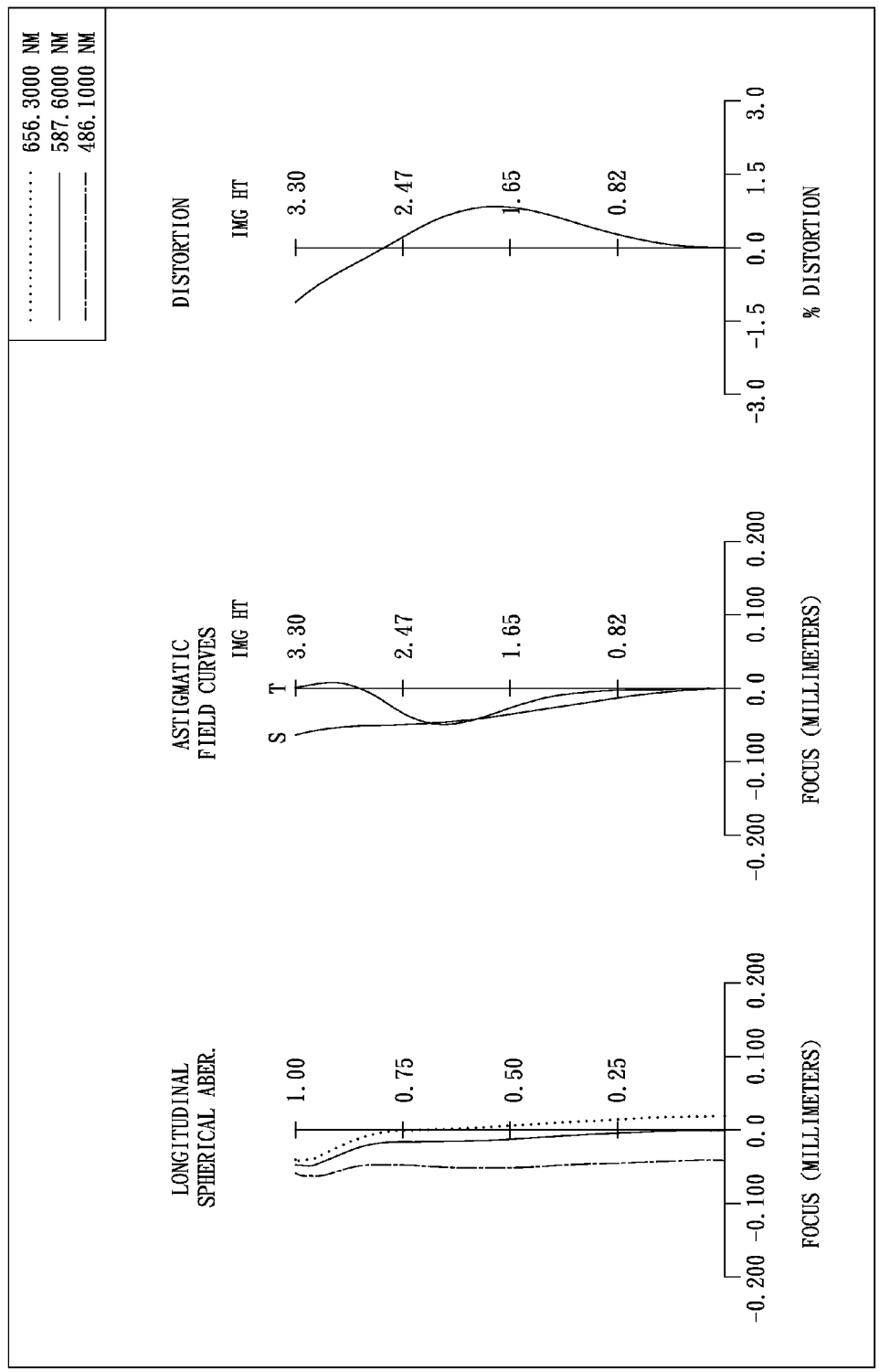
FIG. 6 shows the aberration curves of the third embodiment of the present invention.

Referring to FIG. 5, which shows an optical lens system for taking image in accordance with a third embodiment of the present invention, FIG. 6 shows the aberration curves of the third embodiment of the present invention. The third embodiment of the present invention comprises: in order from the object side to the image side:

A plastic first lens element 10 with positive refractive power has a convex object-side surface 11 and a convex image-side surface 12, and the object-side surface 11 and the image-side surface 12 of the first lens element 10 are aspheric.

A plastic second lens element 20 with negative refractive power has a concave object-side surface 21 and a convex image-side surface 22, and the object-side surface 21 and the image-side surface 22 of the second lens element 20 are aspheric.

A plastic third lens element 30 with negative refractive power has a convex object-side surface 31 and a concave image-side surface 32, the object-side surface 31 and the image-side surface 32 of the third lens element 30 are aspheric, and inflection points are formed on the object-side surface 31 and the image-side surface 32 of the third lens element 30.

An aperture stop 40 located between an object to be imaged and the first lens element 10.

An IR cut filter 50 is located behind the third lens element 30 and has no influence on the focal length of the optical lens system.

An image plane 70 is located behind the IR cut filter 50.

The equation for the aspheric surface profiles of the third embodiment has the same form as that of the first embodiment.

In the third embodiment of the present optical lens system for taking image, the focal length of the optical lens system for taking image is f, the focal length of the first lens element is f1, the focal length of the second lens element is f2, the focal length of the third lens element is f3, and they satisfy the relations:

$f=5.58$ mm;

$f/f1=1.47$;

$|f/f2|=0.41$;

$|f/f3|=0.29$.

In the third embodiment of the present optical lens system for taking image, the Abbe number of the first lens element is V1, the Abbe number of the second lens element is V2, and they satisfy the relations:

$V2=23.4$;

$V1-V2=33.1$.

In the third embodiment of the present optical lens system for taking image, the focal length of the optical lens system for taking image is f, the on-axis distance between the first lens element and the second lens element is T12, the on-axis distance between the second lens element and the third lens element is T23, and they satisfy the relations:

$T12/f=0.10$;

$T23/f=0.17$.

In the third embodiment of the present optical lens system for taking image, the radius of curvature of the object-side surface of the first lens element is R1, the radius of curvature of the image-side surface of the first lens element is R2, and they satisfy the relation:

$R1/R2=-0.03$.

In the third embodiment of the present optical lens system for taking image, an object to be photographed is imaged on an electronic imaging sensor, the total track length of the optical lens system for taking image is TTL, the maximum image height of the optical lens system for taking image is ImgH, and they satisfy the relation:

TTL/Img$H$=1.87.

The detailed optical data of the third embodiment is shown in table 5, and the aspheric surface data is shown in table 6, wherein the units of the radius of curvature, the thickness and the focal length are expressed in mm, and HFOV is half of the maximal field of view.

It is to be noted that the tables 1-6 show different data from the different embodiments, however, the data of the different embodiments is obtained from experiments. Therefore, any product of the same structure is deemed to be within the scope of the present invention even if it uses different data. Table 7 lists the relevant data for the various embodiments of the present invention.

While we have shown and described various embodiments in accordance with the present invention, it should be clear to those skilled in the art that further embodiments may be made without departing from the scope of the present invention.

TABLE 5

(Embodiment 3)
f(focal length) = 5.58 mm, Fno = 2.8, HFOV (half of field of view) = 31.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Aperture Stop | Plano | −0.142 | | | | |
| 2 | Lens 1 | 2.12562(ASP) | 0.919 | Plastic | 1.543 | 56.5 | 3.81 |
| 3 | | −65.85110(ASP) | 0.565 | | | | |
| 4 | Lens 2 | −1.70430(ASP) | 0.600 | Plastic | 1.632 | 23.4 | −13.57 |
| 5 | | −2.41680(ASP) | 0.960 | | | | |
| 6 | Lens 3 | 3.73040(ASP) | 0.814 | Plastic | 1.530 | 55.8 | −19.13 |
| 7 | | 2.52100(ASP) | 0.700 | | | | |
| 8 | IR-filter | Plano | 0.550 | Glass | 1.517 | 64.2 | |
| 9 | | Plano | 1.052 | | | | |
| 10 | Image | Plano | | | | | |

TABLE 6

Aspheric Coefficients

| | Surface # | | | | | |
|---|---|---|---|---|---|---|
| | 2 | 3 | 4 | 5 | 6 | 7 |
| k = | −4.56775E−01 | 1.00000E+03 | −1.36391E+00 | 2.92851E−01 | −2.31264E+01 | −9.67034E+00 |
| A4 = | −7.32778E−03 | −5.20441E−02 | −3.72670E−02 | 6.79148E−03 | −5.82814E−02 | −3.65088E−02 |
| A6 = | −1.21947E−02 | −2.82628E−02 | 1.41479E−02 | 5.95967E−02 | 6.22950E−03 | 2.95509E−03 |
| A8 = | 1.48452E−02 | 1.58792E−02 | 8.69036E−02 | −1.41776E−02 | 4.09708E−04 | −1.21673E−04 |
| A10 = | −4.35669E−02 | −4.62074E−03 | −3.34461E−02 | 3.34881E−02 | −5.80817E−05 | −1.75100E−05 |
| A12 = | 4.21904E−02 | −1.15650E−03 | −2.45914E−02 | −1.86323E−02 | 5.46365E−07 | |
| A14 = | −1.70656E−02 | −7.24625E−04 | 1.20975E−02 | 2.55178E−03 | 1.15740E−07 | |
| A16 = | | | | 2.67776E−05 | | |

TABLE 7

| | Embodiment 1 | Embodiment 2 | Embodiment 3 |
|---|---|---|---|
| f | 2.85 | 2.98 | 5.58 |
| Fno | 2.0 | 2.4 | 2.8 |
| HFOV | 30.0 | 31.9 | 31.0 |
| V2 | 23.4 | 23.4 | 23.4 |
| V1-V2 | 33.1 | 33.1 | 33.1 |
| T12/f | 0.10 | 0.12 | 0.10 |
| T23/f | 0.17 | 0.16 | 0.17 |
| R1/R2 | −0.24 | −0.07 | −0.03 |
| f/f1 | 1.45 | 1.38 | 1.47 |
| |f/f2| | 0.54 | 0.44 | 0.41 |
| |f/f3| | 0.01 | 0.01 | 0.29 |
| TTL/ImgH | 2.19 | 1.99 | 1.87 |

In the present optical lens system for taking image, the lens elements can be made of glass or plastic. If the lens elements are made of glass, there is more freedom in distributing the refractive power of the optical lens system. If the lens elements are made of plastic, the cost will be effectively reduced.

In the present optical lens system for taking image, a lens surface is convex if the paraxial region is convex. A lens surface is concave if the paraxial region is concave.

What is claimed is:

1. An optical lens system for taking image comprising, in order from an object side to an image side:
   an aperture stop;
   a first lens element with positive refractive power having a convex object-side surface and a convex image-side surface;
   a plastic second lens element with negative refractive power having a concave object-side surface and a convex image-side surface, at least one of the object-side and the image-side surfaces of the second lens element being aspheric; and
   a plastic third lens element with negative refractive power having a convex object-side surface and a concave image-side surface, at least one of the object-side and the image-side surfaces of the third lens element being aspheric; in the optical lens system for taking image, the number of the lens elements with refractive power being limited to three, a focal length of the optical lens system for taking image is f, a focal length of the first lens element is f1, a focal length of the second lens element is f2, a focal length of the third lens element is f3, an Abbe number of the first lens element is V1, an Abbe number of the second lens element is V2, an on-axis distance between the second lens element and the third lens element is T23, and they satisfy the relations:

$0.8<f/f1<1.8$;

$0<|f/f2|<0.8$;

$0<|f/f3|<0.7$;

$20<V1-V2<38$;

$0.13<T23/f<0.21$.

2. The optical lens system for taking image as claimed in claim 1, wherein an object to be photographed is imaged on an electronic imaging sensor, a total track length of the optical lens system for taking image is TTL, a maximum image height of the optical lens system for taking image is ImgH, and they satisfy the relation:

$TTL/ImgH<2.3$.

3. The optical lens system for taking image as claimed in claim 1, wherein the focal length of the optical lens system for taking image is f, the focal length of the second lens element is f2, the focal length of the third lens element is f3, and they satisfy the relations:

$0.2<|f/f2|<0.6$;

$0<|f/f3|<0.4$.

4. The optical lens system for taking image as claimed in claim 3, wherein the focal length of the optical lens system for taking image is f, the focal length of the first lens element is f1, the focal length of the third lens element is f3, a radius of curvature of the object-side surface of the first lens element is R1, a radius of curvature of an image-side surface of the first lens element is R2, and they satisfy the relations:

$1.2<f/f1<1.6$;

$0<|f/f3|<0.2$;

$-0.8<R1/R2<0$.

5. The optical lens system for taking image as claimed in claim 4, wherein an on-axis distance between the first lens element and the second lens element is T12, the on-axis distance between the second lens element and the third lens element is T23, the focal length of the optical lens system for taking image is f, the Abbe number of the second lens element is V2, and they satisfy the relations:

$0.08<T12/f<0.13$;

$0.15<T23/f<0.18$;

$V2<25$.

6. The optical lens system for taking image as claimed in claim 1, wherein the object-side surface and the image-side surface of the second lens element are aspheric, the object-side surface and the image-side surface of the third lens element are aspheric, and at least one of the object-side surface and the image-side surface of the third lens element is formed with at least one inflection point.

7. The optical lens system for taking image as claimed in claim 6, wherein the object-side surface and the image-side surface of the first lens element are aspheric, and the first lens element is made of plastic material.

8. The optical lens system for taking image as claimed in claim 7, wherein the focal length of the optical lens system for taking image is f, the focal length of the second lens element is f2, and they satisfy the relation:

$0.2<|f/f2|<0.6$.

9. The optical lens system for taking image as claimed in claim 8, wherein the focal length of the optical lens system for taking image is f, the focal length of the first lens element is f1, the focal length of the third lens element is f3, and they satisfy the relations:

$1.2<f/f1<1.6$;

$0<|f/f3|<0.4$.

10. The optical lens system for taking image as claimed in claim 9, wherein the Abbe number of the first lens element is V1, the Abbe number of the second lens element is V2, and they satisfy the relations:

$28<V1-V2<35$;

$V2<25$.

11. The optical lens system for taking image as claimed in claim 10, wherein the focal length of the optical lens system for taking image is f, the focal length of the third lens element is f3, a radius of curvature of the object-side surface of the first lens element is R1, a radius of curvature of an image-side surface of the first lens element is R2, and they satisfy the relations:

$0<|f/f3|<0.2$;

$-0.8<R1/R2<0$.

12. The optical lens system for taking image as claimed in claim 11, wherein an on-axis distance between the first lens element and the second lens element is T12, the on-axis distance between the second lens element and the third lens element is T23, the focal length of the optical lens system for taking image is f, and they satisfy the relations:

$0.08<T12/f<0.13$;

$0.15<T23/f<0.18$.

13. An optical lens system for taking image comprising, in order from an object side to an image side:
an aperture stop;
a plastic first lens element with positive refractive power having a convex object-side surface and a convex image-side surface, at least one of the object-side and the image-side surfaces of the first lens element being aspheric;
a plastic second lens element with negative refractive power having a concave object-side surface and a convex image-side surface, at least one of the object-side and the image-side surfaces of the second lens element being aspheric; and
a plastic third lens element with negative refractive power having a convex object-side surface and a concave image-side surface, at least one of the object-side and the image-side surfaces of the third lens element being aspheric; in the optical lens system for taking image, the number of the lens elements with refractive power being limited to three; a focal length of the optical lens system for taking image is f, a focal length of the first lens element is f1, a focal length of the third lens element is f3, an Abbe number of the first lens element is V1, an Abbe number of the second lens element is V2, and they satisfy the relations:

$0.8 < f/f1 < 1.8$;

$0.14 < |f/f3| < 0.7$;

$20 < V1 - V2 < 38$.

14. The optical lens system for taking image as claimed in claim 13, wherein an object to be photographed is imaged on an electronic imaging sensor, a total track length of the optical lens system for taking image is TTL, a maximum image height of the optical lens system for taking image is ImgH, and they satisfy the relation:

$TTL/ImgH < 2.3$.

15. The optical lens system for taking image as claimed in claim 13, wherein the object-side surface and the image-side surface of the second lens element are aspheric, the object-side surface and the image-side surface of the third lens element are aspheric, and at least one of the object-side surface and the image-side surface of the third lens element is formed with at least one inflection point.

16. The optical lens system for taking image as claimed in claim 15, wherein an on-axis distance between the second lens element and the third lens element is T23, the focal length of the optical lens system for taking image is f, and they satisfy the relation:

$0 < T23/f < 0.21$.

17. The optical lens system for taking image as claimed in claim 16, wherein the focal length of the optical lens system for taking image is f, the focal length of the first lens element is f1, a focal length of the second lens element is f2, and they satisfy the relations:

$1.2 < f/f1 < 1.6$;

$0.2 < |f/f2| < 0.6$.

18. The optical lens system for taking image as claimed in claim 17, wherein the Abbe number of the first lens element is V1, the Abbe number of the second lens element is V2, and they satisfy the relations:

$28 < V1 - V2 < 35$;

$V2 < 25$.

19. The optical lens system for taking image as claimed in claim 18, wherein an on-axis distance between the first lens element and the second lens element is T12, the on-axis distance between the second lens element and the third lens element is T23, the focal length of the optical lens system for taking image is f, a radius of curvature of the object-side surface of the first lens element is R1, a radius of curvature of an image-side surface of the first lens element is R2, and they satisfy the relations:

$0.08 < T12/f < 0.13$;

$0.15 < T23/f < 0.18$;

$-0.8 < R1/R2 < 0$.

* * * * *